United States Patent
Han et al.

(10) Patent No.: US 11,159,779 B2
(45) Date of Patent: Oct. 26, 2021

(54) MULTI-USER VIEWPORT-ADAPTIVE IMMERSIVE VISUAL STREAMING

(71) Applicant: AT&T Intellectual Property I, L.P., Atlanta, GA (US)

(72) Inventors: Bo Han, Bridgewater, NJ (US); Shu Shi, Summit, NJ (US); Rittwik Jana, Montville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/581,097

(22) Filed: Sep. 24, 2019

(65) Prior Publication Data

US 2021/0092347 A1    Mar. 25, 2021

(51) Int. Cl.
| | | |
|---|---|---|
| H04N 13/282 | (2018.01) | |
| H04N 13/122 | (2018.01) | |
| H04N 13/194 | (2018.01) | |
| H04N 21/63 | (2011.01) | |
| H04N 21/258 | (2011.01) | |
| H04N 21/442 | (2011.01) | |
| H04N 21/262 | (2011.01) | |
| H04N 21/24 | (2011.01) | |
| H04N 21/81 | (2011.01) | |
| H04N 21/218 | (2011.01) | |

(52) U.S. Cl.
CPC ......... *H04N 13/282* (2018.05); *H04N 13/122* (2018.05); *H04N 13/194* (2018.05)

(58) Field of Classification Search
CPC .. H04N 13/282; H04N 13/194; H04N 13/122; H04N 13/239; H04N 13/25; H04N 13/243; H04N 13/00; G06T 2207/10021; G06T 15/00
See application file for complete search history.

(56) References Cited

U.S. PATENT DOCUMENTS

| | | | | |
|---|---|---|---|---|
| 10,062,414 | B1 * | 8/2018 | Westphal | H04N 21/23406 |
| 2010/0031299 | A1 * | 2/2010 | Harrang | H04N 21/44029 |
| | | | | 725/80 |
| 2016/0112392 | A1 * | 4/2016 | Jung | H04N 21/25816 |
| | | | | 726/4 |
| 2017/0265046 | A1 * | 9/2017 | Chen | H04W 4/06 |

(Continued)

OTHER PUBLICATIONS

Hamza, Ahmed and Mohamed Hefeeda. "Adaptive streaming of interactive free viewpoint videos to heterogeneous clients." MMSys '16 (2016). 12 pages. https://api.semanticscholar.org/CorpusID:15656998.

(Continued)

*Primary Examiner* — Alexander Gee (57) ABSTRACT

In one example, a processing system including at least one processor may obtain predicted viewports of a plurality of mobile computing devices for an immersive visual stream, determine at least a first tile of the immersive visual stream that is within the predicted viewports of at least two mobile computing devices of the plurality of mobile computing devices, select a first mobile computing device of the at least two mobile computing devices to transmit the first tile, and transmit to the first mobile computing device, the first tile and at least one identification of at least one other mobile computing device of the at least two mobile computing devices to which the first mobile computing device is to forward the first tile.

20 Claims, 4 Drawing Sheets

(56) References Cited

U.S. PATENT DOCUMENTS

2018/0167349 A1\* 6/2018 James .................. H04L 67/306
2018/0241255 A1\* 8/2018 Leabman ................ H02J 50/23

OTHER PUBLICATIONS

Intel, "Encoding Video at the Edge with Intel® Xeon® Processors" Solution Brief. 2017. 4 pages.
Kobbelt, Leif & Botsch, Mario. (2004). A Survey of Point-Based Techniques in Computer Graphics. Computer. 28. 801-814. 10.1016/j.cag.2004.08.009. Dec. 2004 Computers & Graphics 28(6):801-814; 23 pages. https://www.researchgate.net/publication/200018736_A_Survey_of_Point-Based_Techniques_in_Computer_Graphics.
Kowalski, Marek & Naruniec, Jacek & Daniluk, Michal. (2015). Livescan3D: A Fast and Inexpensive 3D Data Acquisition System for Multiple Kinect v2 Sensors. 318-325. 10.1109/3DV.2015.43. Conference: 2015 International Conference on 3D Vision (3DV), Oct. 2015; 9 pages. https://www.tarq.keybase.pub/livescan3d.pdf.
Le, Tuan & Jeong, JongBeom & Ryu, Eun-Seok. (2019). Efficient Transcoding and Encryption for Live 360 CCTV System. Applied Sciences. 9. 760. 10.3390/app9040760. Feb. 2019, Applied Sciences 9(4):760; 18 pages. https://www.researchgate.net/publication/331278993_Efficient_Transcoding_and_Encryption_for_Live_360_CCTV_System.
Maglo, Adrien & Lavoué, Guillaume & Dupont, Florent & Hudelot, Céline. (2015). 3D Mesh Compression: Survey, Comparisons, and Emerging Trends. Apr. 2015; 40 pages. https://www.researchgate.net/publication/280047242_3D_Mesh_Compression_Survey_Comparisons_and_Emerging_Trends.
Mangiante, Simone & Klas, Guenter & Navon, Amit & Zhuang, Guanhua & Ran, Ju & Silva, Marco. (2017). VR is on the Edge: How to Deliver 360° Videos in Mobile Networks. 30-35. 10.1145/3097895.3097901. Aug. 2017, Conference: the Workshop; 7 pages. https://www.researchgate.net/publication/319049968_VR_is_on_the_Edge_How_to_Deliver_360_Videos_in_Mobile_Networks.
Qian, Feng & Ji, Lusheng & Han, Bo & Gopalakrishnan, Vijay. (2016). Optimizing 360 video delivery over cellular networks. 1-6. 10.1145/2980055.2980056. Oct. 2016, Conference: the 5th Workshop; 6 pages. https://www.researchgate.net/publication/308571053_Optimizing_360_video_delivery_over_cellular_networks.
Qian, Feng & Han, Bo & Xiao, Qingyang & Gopalakrishnan, Vijay. (2018). Flare: Practical Viewport-Adaptive 360-Degree Video Streaming for Mobile Devices. 99-114. 10.1145/3241539.3241565. Oct. 2018, Conference: the 24th Annual International Conference; 16 pages. https://www.researchgate.net/publication/328322475_Flare_Practical_Viewport-Adaptive_360-Degree_Video_Streaming_for_Mobile_Devices.
Schnabel, Ruwen & Klein, Reinhard. (2006). Octree-based Point-Cloud Compression . . . Eurographics Symposium on Point-Based Graphics. 111-120. 10.2312/SPBG/SPBG06/111-120. Jan. 2006, Conference: Symposium on Point Based Graphics, Boston, Massachusetts, USA, 2006. Proceedings; 11 pages. https://www.researchgate.net/publication/221571163_Octree-based_Point-Cloud_Compression.

\* cited by examiner

MULTI-USER VIEWPORT-ADAPTIVE IMMERSIVE VISUAL STREAMING

The present disclosure relates generally to immersive visual streaming, and more particularly to apparatuses, non-transitory computer-readable media, and methods for transmitting, to a first mobile computing device, a first tile of an immersive visual stream and at least one identification of at least one other mobile computing device to which the first mobile computing device is to forward the first tile, and to apparatuses, non-transitory computer-readable media, and methods for obtaining at least a first tile of an immersive visual stream that is within a predicted viewport of a first mobile computing device and at least one identification of at least a second mobile computing device to which the first mobile computing device is to forward the first tile.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes an apparatus, computer-readable medium, and method for transmitting, to a first mobile computing device, a first tile of an immersive visual stream and at least one identification of at least one other mobile computing device to which the first mobile computing device is to forward the first tile. For instance, a processing system including at least one processor may obtain predicted viewports of a plurality of mobile computing devices for an immersive visual stream, determine at least a first tile of the immersive visual stream that is within the predicted viewports of at least two mobile computing devices of the plurality of mobile computing devices, select a first mobile computing device of the at least two mobile computing devices to transmit the first tile, and transmit to the first mobile computing device, the first tile and at least one identification of at least one other mobile computing device of the at least two mobile computing devices to which the first mobile computing device is to forward the first tile.

In another example, the present disclosure describes an apparatus, computer-readable medium, and method for obtaining at least a first tile of an immersive visual stream that is within a predicted viewport of a first mobile computing device and at least one identification of at least a second mobile computing device to which the first mobile computing device is to forward the first tile. For instance, a processing system of a first mobile computing device including at least one processor may obtain viewport information of the first mobile computing device associated with an immersive visual stream, transmit to a server the viewport information of the first mobile computing device, obtain from the server at least a first tile of the immersive visual stream that is within a predicted viewport of the first mobile computing device and at least one identification of at least a second mobile computing device to which the first tile is to be forwarded, where the predicted viewport is in accordance with the viewport information, and forward to at least the second mobile computing device, the at least the first tile, in accordance with the at least one identification.

Examples of the present disclosure provide a two-tier architecture for providing an immersive visual stream, such as a 360-degree video, to a group of users simultaneously. High-throughput broadcast/multicast is still not widely available in mobile wireless networks (e.g., cellular networks and Institute of Electrical and Electronics Engineers (IEEE) 802.11 networks). Thus, content delivery platforms generally have to send a requested video to different users via multiple unicast sessions. To illustrate, a high-quality 360-degree video may be encoded at a minimum of a 20 Mbps bitrate. Suppose there are 20 users in a group (such as in a classroom teaching scenario). A network link with 400 Mbps would be needed, which current networks are not typically able to accommodate. A content delivery platform may employ a viewport-adaptive scheme that primarily transmits content within a user's viewport, and which reduces the bandwidth by up to approximately 80%. However, streaming to 20 users may still utilize at least 80 Mbps, which remains challenging to achieve, especially during peak hours.

Examples of the present disclosure relate to tile-based immersive visual streams, e.g., in which the immersive visual stream is segmented into multiple tiles, where the tiles that overlap with a predicted viewport of a user are delivered to the user's mobile computing device. When multiple users watch the same immersive visual stream in a group, it is likely a single tile may be requested by several users. The present disclosure delivers that tile to one selected user's mobile computing device (e.g., a "client" or "client device") through a wide-area, mobile wireless network, and that user's mobile computing device disseminates the tile to other mobile computing devices for which users' predicted viewports overlap with the same tile via local peer-to-peer communications. In one example, the present disclosure determines priorities among the tiles to be delivered and selects a particular client to deliver a specific tile for further dissemination. Accordingly, examples of the present disclosure improve both network efficiency and users' quality of experience (QoE). Although examples of the present disclosure are described primarily in connection with 360-degree panoramic video streaming, the present examples may similarly be applied to non-360-degree video (including "regular"/non-immersive video), volumetric video, and so forth. In this regard, an "immersive visual stream" may comprise a video that is recorded and stored at a server, or may comprise "live" video that is captured via one or more cameras and streamed over one or more networks from a source. In addition, an immersive visual stream may alternatively or additionally comprise user-generated and/or computer-generated visual content, e.g., animations, annotations, etc.

In a 360-degree video system, a user wearing a display headset can freely change the viewing direction. Technically, the user is situated in the center of a virtual sphere, and the panoramic contents may be downloaded from video servers and projected onto the sphere (e.g., using equirectangular projection). The user's viewport (visible area) is determined by the viewing direction (in latitude/longitude) and the field of view (FoV) of the headset, e.g., in real time or near-real time. The FoV defines the extent of the observable area, which may be a fixed parameter of the headset. In addition to headset-type clients, 360-degree video may also be displayed via other types of mobile computing devices, such as via a tablet computer or smartphone. For instance, by orienting the device in a particular direction, a user may define the FoV. Alternatively, or in addition, inputs via a touchscreen, keypad, mouse, joystick, or the like may also be used to orient the FoV within the 360-degree space of the video.

Maintaining QoE for 360-degree videos over bandwidth-limited links on commodity mobile devices remains challenging. First, 360-degree videos are large: under the same perceived quality, 360-degree videos have around 5× larger sizes than conventional videos. Second, 360-degree videos are complex: sophisticated projection and content representation schemes may incur high computational overhead. Third, 360-degree videos are still under-explored: there is a lack of real-world experimental studies of key aspects such as rate adaptation, QoE metrics, and cross-layer interactions (e.g., with Transmission Control Protocol and web protocols such as Hypertext Transfer Protocol (HTTP)/2).

One approach to 360-degree video streaming is monolithic streaming. Monolithic streaming delivers uniformly encoded panoramic views and is widely used by many commercial 360-degree video content providers. For more advanced schemes that perform viewport adaptation, a 360-degree video has multiple versions each having a different scene region, called a quality emphasized region (QER), with a higher encoding rate. A player picks the right version based on the viewer's head orientation. One practical issue of this scheme is that it incurs significant processing and storage overhead at the server side, because a single video may be encoded into close to 100 different versions, each having a different QER.

Figure 1:
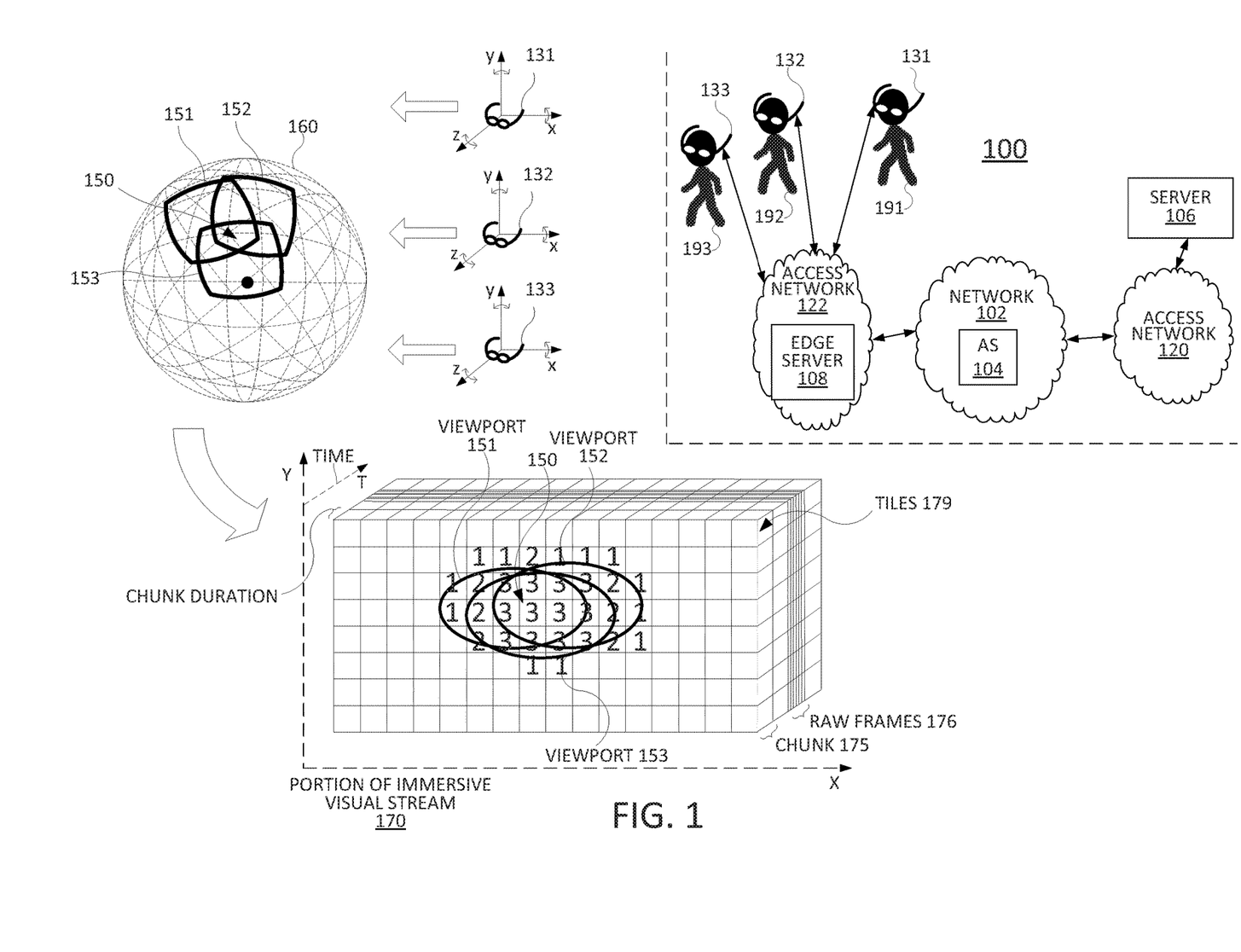
FIG. 1 illustrates an example network related to the present disclosure.

Another approach to 360-degree video streaming is viewport-adaptive tile-based streaming in which a 360-degree video is spatially (and temporally) segmented into tiles, and only tiles overlapping with predicted FoVs are delivered. To increase the robustness, a player can also fetch the remaining tiles at lower quality, or qualities. In this scheme, each 360-degree video chunk is pre-segmented into multiple smaller units, which are called tiles. One way to generate the tiles is to evenly divide a chunk containing projected raw frames into m×n rectangles each corresponding to a tile. Suppose the projected visible area is ⊖. The client may then request the tiles from the available m×n rectangles that overlap with ⊖. A tile has the same duration and number of frames as the chunk to which it belongs, but occupies a smaller spatial portion. Each tile can be independently downloaded and decoded. Note that due to projection, despite the viewer's FoV being fixed, the size of ⊖ and thus the number of requested tiles may vary. Compared to FoV-agnostic approaches, tiling offers significant bandwidth saving. An example of tiling of chunks is illustrated in FIG. 1 and described in greater detail below.

Although the above schemes may be adequate when delivering 360-degree video to a single user, challenges remain when multiple users watch the same video together (e.g., students in the same classroom view a 360-degree video of an educational event). A medium quality 360-degree video may be encoded with 15-20 Mbps. For high quality 4K or 8K 360-degree video, the encoding bit rate is even higher. With many classes having more than 20 students, separate unicast streams may lead to an excessive network bandwidth requirement that most current network infrastructure may not support. It should be noted that broadcast/multicast (e.g., (MBMS) Multimedia Broadcast Multicast Services in 3GPP ($3^{rd}$ Generation Partnership Project)) may be a desirable solution. However, currently it is not widely deployed in cellular networks. In addition, IEEE 802.11 networks may use the lowest bitrate for broadcast/multicast traffic according to the protocol. For instance, in order to guarantee that all the users in the broadcast/multicast group can receive the delivered data packets, the lowest (and the most reliable) bit rate may be selected. This broadcast/multicast bitrate is generally even lower than the required bandwidth for a single 360-degree video stream.

Examples of the present disclosure address the delivery of high quality immersive visual streams, including 360-degree videos, to multiple users simultaneously. When multiple users watch the same immersive visual stream in a group, it is likely a single tile may be requested by several users. The present disclosure delivers that tile to one selected user's mobile computing device through a wide-area, mobile wireless network, and that user's mobile computing device disseminates the tile to other mobile computing devices for which users' predicted viewports overlap with the same tile via local peer-to-peer communications. In one example, the present disclosure determines priorities among the tiles to be delivered and selects a proper user or mobile computing device to deliver a specific tile for further dissemination. Note that users may experience 360-degree videos using headsets. Thus, it may not be possible for users to screen-share directly with one another.

It has been shown that when multiple users watch the same 360-degree video, most of the users tend to view the so-called Region of Interest (RoI) in each frame. In connection with enabling and facilitating the sharing of downloaded tiles among users, the present disclosure may also determine the priorities of these tiles, as not all tiles are equal. In addition, the present disclosure may determine a target user (e.g., the user's mobile computing device) that a specific tile will be delivered to, as not all users are equal.

If all users in a group have the same viewport, it may be possible to simply deliver the tiles overlapping with that viewport. In practice, the viewports vary for different users based on their viewing directions. As a result, even if a tile will be consumed by a single user, the tile may still need to be delivered to that single user. However, the delivery may be in competition with other tiles for network resources. For mobile computing devices receiving a tile through local peer-to-peer communications, the end-to-end latency may be longer due to the overhead of local forwarding, compared to obtaining the tile directly from a content server (i.e., without forwarding by a peer mobile computing device). In order to optimize the end-to-end latency, the present disclosure may provide tiles that are requested by a greater number of clients at a higher forwarding priority than those tiles that will be consumed by a lesser number of clients (e.g., a single client). For instance, in one example, the present disclosure may assign a priority to a tile based on the tile's popularity (e.g., how many clients request this tile).

For tiles with the same priority, these tiles may be ordered based on their respective playback deadlines. If a tile is requested by multiple clients, the playback deadline is the earliest playback time among these clients. When sending a tile to the selected client, the video content server also attaches a forward-user list that specifies other clients which may also need the tile.

After determining the priority of a tile, a target client is selected to which to deliver the tile. The selected client is responsible for forwarding the tile to other clients in the forward-user list. There may be several factors that affect the selection of a target client. For instance, the playback deadlines of respective clients requesting the tile may be considered in the selection of a target client. To illustrate, even for users in the same physical location watching the same video offered by the same content provider, the video playback time may vary. For example, if a user experienced a stall, the playback time will be delayed. Hence, a tile may be delivered directly via wide area network(s) to the client having the earliest playback deadline for this tile. In addition, the present disclosure may also account for respective channel qualities and/or bandwidths available to different clients. For example, when the network throughput is high, the tile delivery may be more advanced than its playback. That is, even for the client with the earliest playback deadline of a tile, there may still be more than sufficient time to deliver that tile (e.g., the earliest playback time of a client is in 10 seconds and it would take only 1 second to deliver the tile to any of the clients requesting the tile). In this scenario, the present disclosure may prefer to select a client with the best network conditions (e.g., the best wireless channel quality and/or throughput) and/or the best connectivity to other clients (e.g., a client in the center of a classroom) since the selected client should forward this tile to others as early as possible. Alternatively, or in addition, the present disclosure may use a round-robin scheduling scheme to avoid selecting the same client or clients too frequently. For instance, the local forwarding of tiles to other clients consumes energy on the selected client/mobile computing device. Thus, if a specific client is always or too often selected as the target client, this client/mobile computing device may quickly deplete its battery.

A workflow of the present disclosure may proceed as follows. First, a video content server may collect viewport movement traces periodically or according to a different schedule, from clients/mobile computing devices in a group. The video content server may then predict future viewports for each user, e.g., using a pre-trained machine learning model (MLM). In another example, clients may provide respective viewport predictions to the video content server. In either case, the video content server may determine the priorities of tiles and select a target client for delivery of each tile, as described above. The video content server finally delivers tiles based on their priorities along with their forward-user lists. At the client side, after receiving a tile with a forward-user list, a client may send the tile to other clients specified in the forward-user list. The client may also buffer the tile for rendering via a display of the client. In some cases, the client may also receive one or more tiles from other clients via a peer-to-peer communication. Any such tiles received in this way may also be buffered for rendering in addition to other tiles, e.g., of a same video chunk. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network, where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
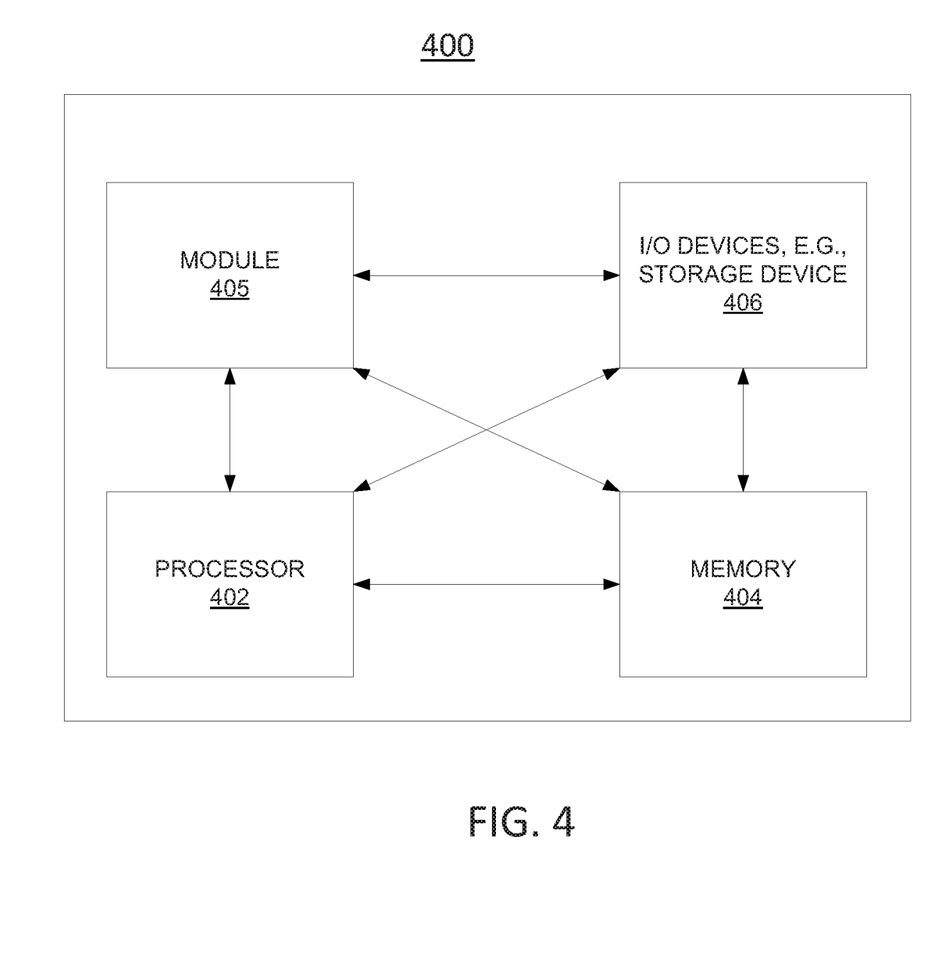
FIG. 4 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for transmitting, to a first mobile computing device, a first tile of an immersive visual stream and at least one identification of at least one other mobile computing device to which the first mobile computing device is to forward the first tile.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 is illustrated, it should be noted that any number of servers may be deployed, and which may operate in a distributed and/or coordinated manner as a processing system to perform operations in connection with the present disclosure.

In one example, AS 104 may comprise a centralized network-based server for immersive visual streaming. In one example, AS 104 may comprise a physical storage device (e.g., a database server), to store immersive visual streams (e.g., "regular" videos, 360-degree videos and/or non-360-degree panoramic videos, volumetric videos, etc.). AS 104 may also transmit immersive visual streams to requesting devices in accordance with the present disclosure. For ease of illustration, various additional elements of network 102 are omitted from FIG. 1.

Figure 2:
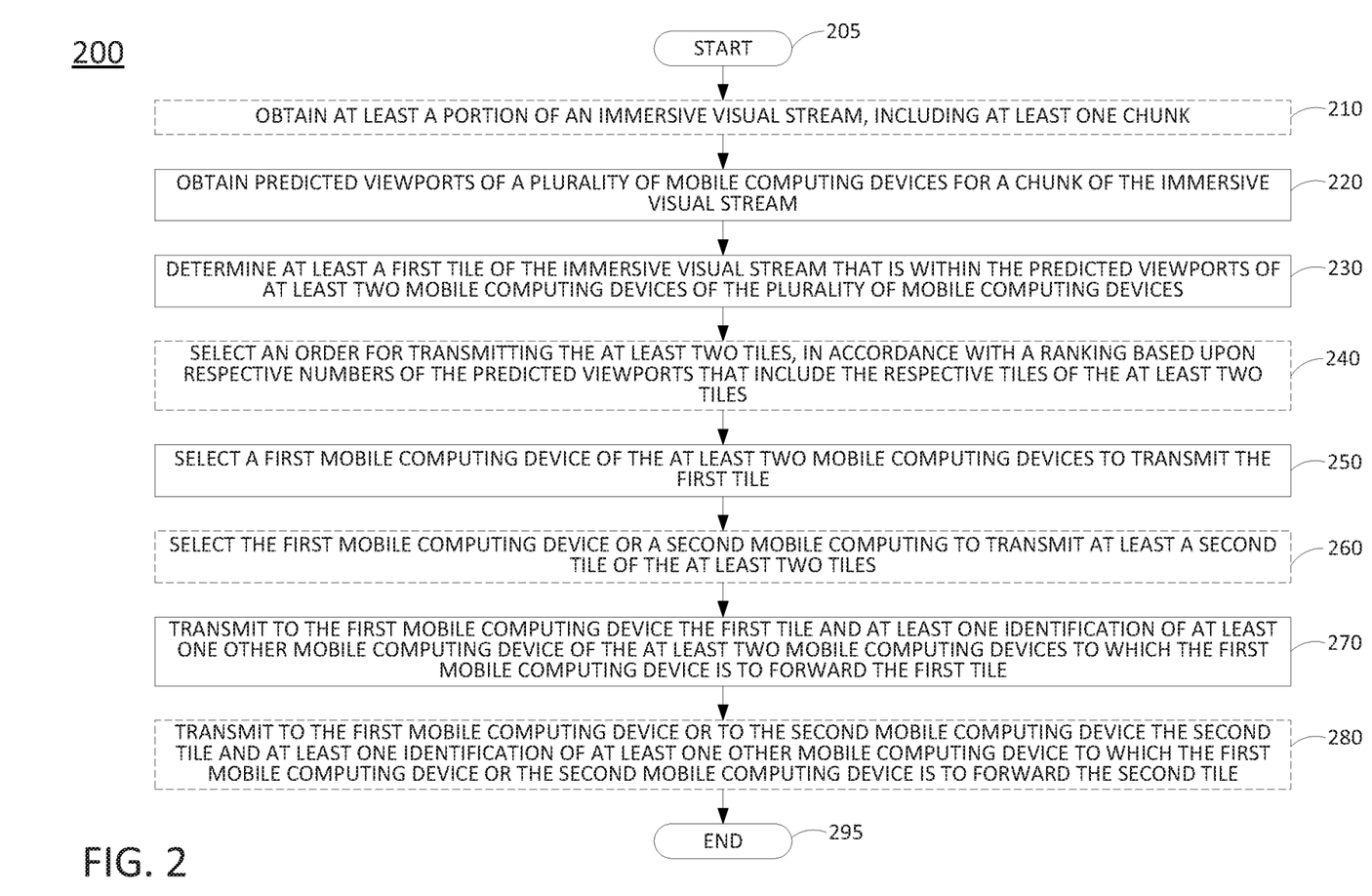
FIG. 2 illustrates a flowchart of an example method for transmitting to a first mobile computing device a first tile of an immersive visual stream and at least one identification of at least one other mobile computing device to which the first mobile computing device is to forward the first tile.

In one example, access network 122 may include an edge server 108, which may comprise a computing system or server, such as computing system 400 depicted in FIG. 4, and may be configured to provide one or more operations or functions for transmitting, to a first mobile computing device, a first tile of an immersive visual stream and at least one identification of at least one other mobile computing device to which the first mobile computing device is to forward the first tile, as described herein. For instance, an example method 200 for transmitting, to a first mobile computing device, a first tile of an immersive visual stream and at least one identification of at least one other mobile computing device to which the first mobile computing device is to forward the first tile is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises a radio access network, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

Figure 3:
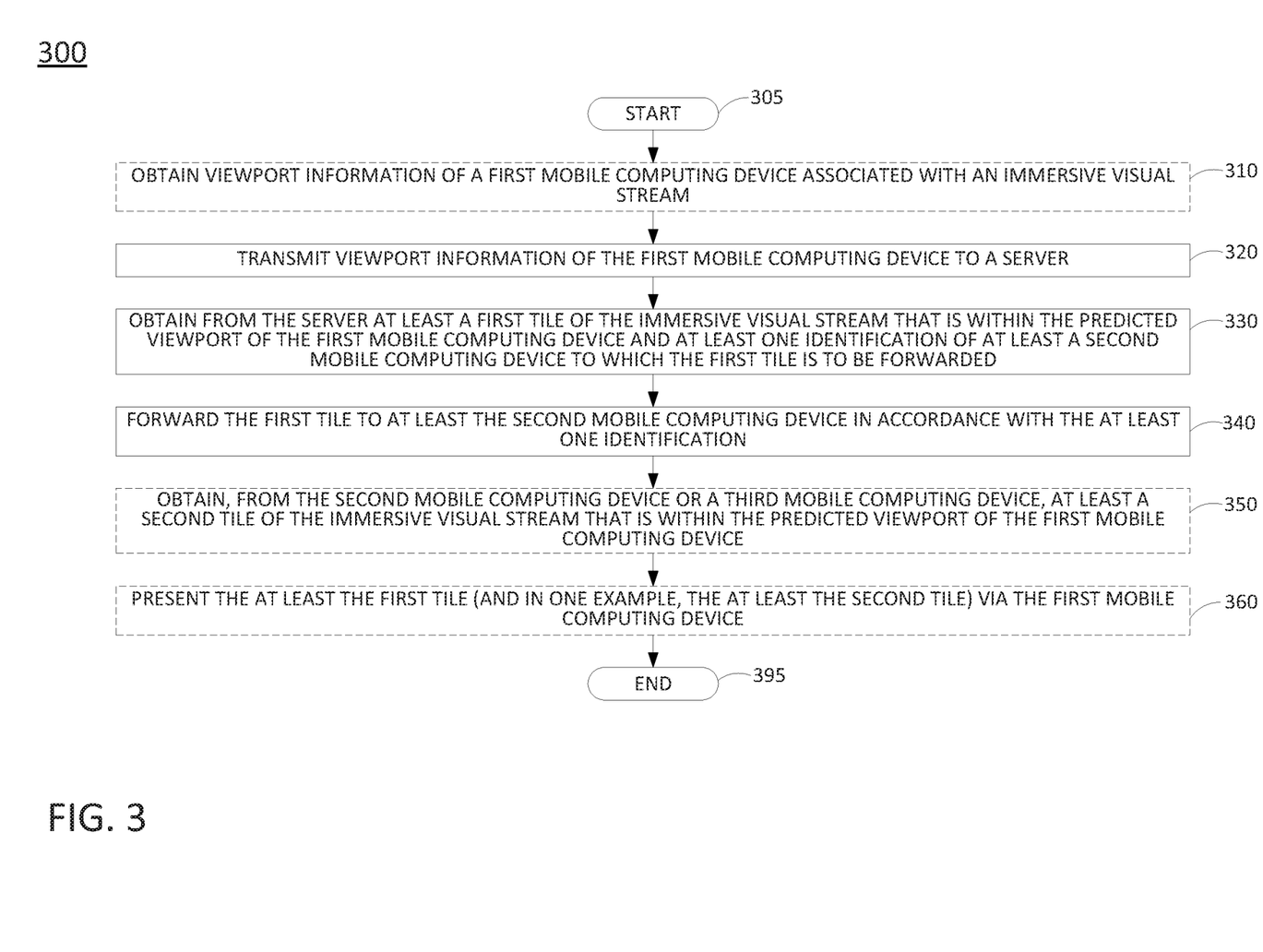
FIG. 3 illustrates a flowchart of an example method for obtaining at least a first tile of an immersive visual stream that is within a predicted viewport of a first mobile computing device and at least one identification of at least a second mobile computing device to which the first mobile computing device is to forward the first tile.

In one example, the access network 120 may be in communication with a server 106. Similarly, access network 122 may be in communication with one or more devices, e.g., devices 131-133. Access networks 120 and 122 may transmit and receive communications between server 106, devices 131-133, application server (AS) 104, other components of network 102, devices reachable via the Internet in general, and so forth. In one example, each of devices 131-133 may comprise a mobile device, a cellular smart phone, a wearable computing device (e.g., smart glasses, a virtual reality (VR) headset, or the like), a laptop computer, a tablet computer, or the like (broadly a "mobile computing device"). In one example, each of devices 131-133 may comprise a computing system or device, such as computing system 400 depicted in FIG. 4, and may be configured to provide one or more operations or functions for obtaining at least a first tile of an immersive visual stream that is within a predicted viewport of a first mobile computing device and at least one identification of at least a second mobile computing device to which the first mobile computing device is to forward the first tile. For instance, an example method 300 for obtaining at least a first tile of an immersive visual stream that is within a predicted viewport of a first mobile computing device and at least one identification of at least a second mobile computing device to which the first mobile computing device is to forward the first tile is illustrated in FIG. 3 and described in greater detail below.

In one example, server 106 may comprise a network-based server for immersive visual streaming. In this regard, server 106 may comprise the same or similar components as those of AS 104 and may provide the same or similar functions. Thus, any examples described herein with respect to AS 104 may similarly apply to server 106, and vice versa. In particular, server 106 may be a component of an immersive visual streaming system operated by an entity that is not a telecommunications network operator. For instance, a provider of an immersive visual streaming system may operate server 106 and may also operate edge sever 108 in accordance with an arrangement with a telecommunication service provider offering edge computing resources to third-parties. However, in another example, a telecommunication network service provider may operate network 102 and access network 122, and may also provide an immersive visual streaming system via AS 104 and edge server 108. For instance, in such an example, the immersive visual streaming system may comprise an additional service that may be offered to subscribers, e.g., in addition to network access services, telephony services, traditional television services, and so forth.

In an illustrative example, an immersive visual streaming system may be provided via edge server 108, or edge server 108 in conjunction with AS 104. For example, users 191-193 may comprise a teacher and students in a classroom setting. The respective users 191-193 may engage applications on devices 131-133 (e.g., "mobile computing devices") to establish one or more sessions, or connections, with edge server 108. In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between devices 131-133 and edge server 108 may involve cellular communication via one or more base stations (e.g., eNodeBs, gNBs, or the like). However, in another example, the communications may alternatively or additionally be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, devices 131-133 may communicate with access network 122, network 102, the Internet in general, etc., via a WLAN that interfaces with access network 122.

In the example of FIG. 1, devices 131-133 may establish sessions with edge server 108 for obtaining an immersive visual stream, which may be obtained in chunks comprising a plurality of tiles. For illustrative purposes, the immersive visual stream may comprise a 360-degree panoramic video. In this regard, an example chunk 175 of a portion of an immersive visual stream 170 is illustrated in FIG. 1.

In one example, the tiles 179 may be generated by evenly dividing chunks (such as chunk 175) containing projected raw frames 176 into m×n rectangles (e.g., 16×8), each rectangle corresponding to a tile 179. A tile (e.g., each of tiles 179) has the same duration and number of frames as the chunk to which it belongs (e.g., chunk 175), but occupies a smaller spatial portion. Each tile 179 can be independently downloaded and decoded by devices 131-133.

In the illustrative example, each of the raw frames 176 may comprise a spherical frame providing a 360-degree (e.g., in azimuth and elevation) panorama. In one example, the edge server 108 may store a copy of the immersive visual stream (e.g., for a recorded video program). In another example, the edge server 108 may obtain the immersive visual stream (e.g., the frames, chunks, and/or tiles thereof) from a centralized server for distributing immersive visual streams. For instance, AS 104 or server 106 may comprise such a centralized server. In one example the immersive visual stream may comprise a "live" stream that may be transmitted by AS 104 or server 106. For instance, video capture devices may feed AS 104 or server 106 with video chunks, where AS 104 or server 106 may disseminate the immersive visual stream (the chunks thereof) in real-time or near-real-time (e.g., as fast as AS 104 and/or server 106 may process the chunks, including any formatting/encoding, tiling, etc.). In one example, AS 104 or server 106 may encode the immersive visual stream into a plurality of chunks comprising bitrate variants for a given time unit of the immersive visual stream. Alternatively, or in addition, AS 104 or server 106 may encode the immersive visual stream in accordance with (Moving Picture Experts Group-4), H.264/AVC (Advanced Video Coding), H.265/HEVC (High Efficiency Video Coding), or the like (e.g., within each tile).

Each of devices 131-133 may comprise a wearable device which may include sensors for determining yaw, pitch, and roll parameters (e.g., along x, y, and z axes as illustrated in FIG. 1). For experiencing a 360-degree video, the devices 131-133 may translate the x, y, and z parameters into respective viewports 151-153. For instance, the viewport 151 may comprise a projection of the field of view (FoV) of device 131 on the surface of a sphere 160 in the direction of a vector comprising the detected yaw, pitch, and roll (x, y, z) for device 131. Viewports 152 and 153 may be similarly calculated for devices 132 and 133, respectively. In one example, each of the raw frames 176 may comprise visual information corresponding to the sphere 160. For instance, spherical visual information captured from an environment via a 360-degree camera may be transformed into raw frames 176 via equirectangular projection, or the like. The raw frames 176 may then be grouped into respective chunks, such as chunk 175. In addition, each of the chunks may be subdivided into tiles 179, as discussed above. In another example, the spherical visual information contained in raw frames 176 may alternatively or additionally comprise human and/or computer generated visual information (e.g., animations, textual or other visual annotations over recorded visual information, etc.).

When receiving and rendering tiles (e.g., including assembling multiple tiles into each chunk), device 131 may determine the viewport 151, may identify tiles of the chunk corresponding to the viewport 151, may decode the tiles corresponding to the viewport 151 into frames (assuming device 131 has already obtained and cached such tiles), and may render the frames via display components of the device 131 (e.g., one or more display screens, projectors, or the like). Devices 132 and 133 may similarly obtain tiles of a chunk, identify tiles corresponding to the respective viewports 152 and 153, decode the tiles corresponding to the respective viewports 152 and 153 into frames, and render the frames for display.

As described above, the present disclosure may opportunistically identify one or more tiles that may be requested by multiple clients, and deliver such tiles to particular selected clients for further dissemination to the other clients that may request the same tile(s). In the example of FIG. 1, it appears that some of the tiles 179 of chunk 175 are within the FoV of all of viewports 151-153. For instance, tiles 179 of chunk 175 that are labeled within the number "3" appear to lie within the region 150 where all of viewports 151-153 overlap. Similarly, some of the tiles 179 of chunk 175 labeled with the number "2" appear to lie within two of the three viewports 151-153. On the other hand, tiles 179 of chunk 175 that are labeled with the number "1" appear to lie only within a single one of the viewports 151-153. Tiles 179 of chunk 175 that have no number label are not within any of the viewports 151-153.

In one example, each of the devices 131-133 may predict a respective one of the viewports 151-153. In other words, viewports 151-153 may represent predicted viewports. For instance, a predicted viewport may be predicted for a time when it is anticipated that the chunk 175 will be played-out (the "playback time" of chunk 175). A prediction of each of viewports 151-153 may be based upon actual measured viewport information (e.g., recent viewport information). In one example, the recent viewport information (which may be referred to as a "viewport trace"), may be processed via a trained machine learning algorithm (MLA), e.g., a MLM, to output a predicted viewport. For instance, the recent viewport information may indicate a trajectory of a viewport in a general direction. It may be expected that the viewport movement is likely to continue in the same general direction as indicated by the trajectory, which may be quantified by the output of the MLM (e.g., the predicted viewport). After predicting viewports 151-153 at the respective devices 131-133 with regard to the respective anticipated playback times of chunk 175, the devices 131-133 may either submit the viewports 151-153 to edge server 108 (e.g., information sufficient to identify the viewport, such as the FoV, yaw, pitch, and roll parameters, etc.). With respect to other examples, such as those relating to volumetric video or VR experiences allowing for movement within a visual space, the parameters may also include a position/location. In another example, devices 131-133 may each determine a respective one of the predicted viewports 151-153, may determine the respective tiles of tiles 179 of chunk 175 overlapping with the one of the respective predicted viewports 151-153, and may submit requests to the edge server 108 for the respective tiles that are identified.

In another example, the predicted viewports 151-153 may alternatively or additionally be calculated by the edge server 108. To illustrate, the edge server 108 may obtain viewport traces from devices 131-133. For instance, devices 131-133 may periodically send actual measured viewport information (e.g., recent viewport information) to edge server 108. Edge server 108 may then use the recent viewport information to calculate/predict the viewports 151-153 for the anticipated play-out times of chunk 175 at the respective devices 131-133, e.g., via a trained MLA, e.g., a MLM, to output respective predicted viewports 151-153. The edge server 108 may similarly map the predicted viewports 151-153 to the respective ones of the tiles 179 of chunk 175 that lie within the respective viewports 151-153.

In one example, the prediction of viewports 151-153 may be further based upon heatmap and/or saliency map-based RoI identification. For instance, edge server 108 may obtain (e.g., from AS 104) heatmap information identifying a region or regions of the frame 170 that are most popular among prior users. Similarly, edge server 108 may obtain (e.g., from AS 104) saliency map information identifying a region or regions of the frame that are determined to be the most "salient" according to an image saliency detection algorithm (e.g., as applied to individual frames or a plurality of frames). In one example, edge server 108 may provide viewport traces obtained from devices 131-133 (and other devices, if present) to AS 104 for aggregation and developing heatmaps for frames and/or chunks of the immersive visual stream 170 (including chunk 175 and/or raw frames 176). The saliency map information and heatmap information may be stored along with the immersive visual stream (where the immersive visual stream comprises recorded and stored content). The saliency map and/or heatmap-identified RoIs can then be used in conjunction with viewport trajectories of devices 131-133 to further increase the accuracy of future viewport prediction for viewports 151-153 of devices 131-133, and/or for other devices (if present). In one example, the saliency map and/or heatmap information may comprise additional inputs into a MLM for viewport prediction at the edge server 108. In another example, a predicted viewport may be generated via the MLM and combined with the saliency map and/or heatmap information to modify the predicted viewport as received from a client (e.g., one of devices 131-133). For instance, the edge server 108 may adjust one or more of the predicted viewports 151-153, e.g., to move a center of the predicted viewport toward a region or regions of the frame that are identified in the saliency map and/or heatmap information.

In any case, after identifying the tiles that are within the respective viewports 151-153 (either via requests from the devices 131-133, or via calculation at the edge server 108), edge server 108 may then identify those tiles that may be needed by multiple devices, and for each such tile, may select one of those devices to deliver the tile for forwarding to the other devices that may be in need of the tile. In one example, edge server 108 may provide tiles that are requested (or determined to be needed) by a greater number of clients (e.g., labeled with number "3") a higher forwarding priority than those tiles that will be consumed by a lesser number of clients (e.g., those labeled with number "2" or number "1"). For tiles with the same priority, these tiles may be ordered based on their respective playback deadlines. For instance, the playback deadline for a tile is the earliest playback time among devices 131-133. After determining the priority of a tile, a target client (e.g., one of devices 131-133) may be selected to which to deliver the tile. The selected client is responsible for forwarding the tile to other clients in a forward-user list. For instance, when sending a tile to the selected client, the edge server 108 may also attach a forward-user list that specifies other clients which may also need the tile.

There may be several factors that affect the selection of a target client. For instance, the playback deadlines of respective clients requesting the tile may be considered in the selection of a target client. To illustrate, even for users 191-193 who may be in the same physical location experiencing the same immersive visual stream 170, the playback times may vary for the same chunk. For example, if one of users 191-193 experienced a stall at a respective one of devices 131-133, the playback time will be delayed. Hence, a tile requested or predicted to be needed by multiple clients may be transmitted by edge server 108 to the client having the earliest playback deadline for this tile (e.g., the playback time/deadline for the chunk at the client). In addition, the edge server 108 may also account for respective channel qualities and/or bandwidths available to the devices 131-133. For example, when the network throughput is high, the tile delivery may be more advanced than its playback. That is, even for the client with the earliest playback deadline of a tile, there may still be more than sufficient time to deliver that tile (e.g., the earliest playback time of a client is in 10 seconds and it would take only 1 second to deliver the tile to any of the clients requesting the time). In this scenario, the edge server 108 may select a client with the best network conditions (e.g., the best wireless channel quality and/or throughput) and/or the best connectivity to other clients (e.g., a client in the center of a classroom) since the selected client should forward this tile to others as early as possible. For example, if user 192 and device 132 are in the center of a classroom, edge server 108 may prefer to send a tile, or multiple tiles of chunk 175 to device 132 for forwarding to devices 131 and 133 (device 132 may also store/buffer the tile for itself). It should be noted that edge server 108 may account for both the channel qualities between the edge server 108 and each of the devices 131-133 as well as channel/connection quality of any of the available peer-to-peer connections among devices 131-133. For instance, a device with good peer-to-peer connections with the greatest number of other devices may be selected rather than a device with few available peer-to-peer connections and/or peer-to-peer connections with poor quality. Alternatively, or in addition, the edge server 108 may use a round-robin scheduling scheme to avoid selecting the same client(s) too frequently.

In one illustrative example, edge server 108 may elect to send all of the tiles of chunk 175 labeled with number "3" to device 132. On the other hand, various tiles of chunk 175 labeled with the number "2" may be sent to one of the two devices having viewports overlapping with and/or including respective tiles labeled with the number "2." For instance, some of these tiles labeled with the number "2" may be transmitted to device 133 (e.g., for forwarding to device 131), while others may be transmitted to device 131 (e.g., for forwarding to device 133). However, it should also be noted that some or all of the tiles of chunk 175 labeled with the number "2" may alternatively be transmitted to device 132 for forwarding to either device 131 or to device 133. Lastly, each of the tiles of chunk 175 labeled with the number "1" may be transmitted to a respective one of devices 131-133 that requested and/or is predicted to need the respective tile.

For some of the tiles received at a respective one of devices 131-133, the device may inspect a forward-user list to identify one or more other devices to which the tile(s) should be forwarded. For instance, device 132 may receive one or more tiles of the chunk 175 (e.g., those labeled with the number "3"). For each of these tiles, a forward-user list may identify devices 131 and 133. Thus, device 132 may forward the one or more tiles to devices 131 and 133, respectively, via local, peer-to-peer communications. Device 132 may also buffer the one or more tiles in a local cache. In addition, device 132 may obtain one or more additional tiles via local peer-to-peer communications, e.g., from device 131 and/or from device 132 and may buffer the tiles in the local cache. The peer-to-peer communications may be in accordance with IEEE 802.15, e.g., Bluetooth, Wi-Fi Direct, or the like. Lastly, the edge server 108 may also transmit to device 132 tiles that are predicted to only be needed by device 132 (and similarly to devices 131 and 133 for tiles predicted to only be needed by those respective devices).

When the playback time for the chunk 175 occurs at device 132, device 132 may then determine an actual viewport and may retrieve from the local cache and render those tiles of chunk 175 that overlap with the actual viewport of device 132. Devices 131 and 133 may similarly determine the actual viewports and render tiles for presentation for chunk 175 at the respective playback times for chunk 175 at the devices 131 and 133.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 106, or may be provided by AS 104 in conjunction with server 106. For instance, AS 104 and server 106 may be configured in a load balancing arrangement, or may be configured to provide for backups or redundancies with respect to each other, and so forth. In still another example, instead of immersive visual streaming from servers storing immersive visual content, the streaming may be device-to-device. For instance, edge server 108 and AS 104 and/or server 106 may provide similar functions in support of streaming of immersive visual content from another mobile computing device (or other user endpoint device, such as a desktop computer, a smart television, etc.) that is capable of capturing immersive visual content (e.g., 360-degree video or non-360-degree panoramic video) to device 132. For example, another person may travel to an interesting destination and may wish to share an immersive visual stream captured from the destination with user 192, e.g., in real-time or near-real-time. In such an example, the immersive visual stream may be generated by the other endpoint device and forwarded to edge server 108, where edge server 108 may transcode frames and forward to device 132 in accordance with the present disclosure, (e.g., performing the operations of the example method 300 of FIG. 3, and/or as described elsewhere herein).

In addition, it should again be noted that a spherical or nearly complete spherical "360-degree video" is just one example of an immersive visual stream in accordance with the present disclosure. For instance, in another example, a "360-degree video" may comprise a cylindrical panorama covering 360 degrees in azimuth (horizontal) and less than 360 degrees in elevation/vertically (e.g., 90 degrees of elevation in any given azimuthal direction). In another example, the immersive visual stream may comprise less than 360-degree panoramic video, such as 270 degrees (cylindrically) in azimuth, 230 degrees in azimuth, etc. As noted above, other examples may include volumetric video (e.g., voxel-based volumetric video). Thus, these and other modifications are all contemplated within the scope of the present disclosure.

FIG. 2 illustrates a flowchart of an example method 200 for transmitting, to a first mobile computing device, a first tile of an immersive visual stream and at least one identification of at least one other mobile computing device to which the first mobile computing device is to forward the first tile, in accordance with the present disclosure. In one example, the method 200 is performed by a component of the system 100 of FIG. 1, such as by edge server 108, AS 104, or server 106, and/or any one or more components thereof (e.g., a processor, or processors, performing operations stored in and loaded from a memory), or by edge server 108, AS 104, or server 106, in conjunction with one or more other devices, such as devices 131-133, a different one of edge server 108, AS 104, or server 106, and so on. In one example, the steps, functions, or operations of method 200 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and may proceed to optional step 210 or to step 220.

At optional step 210, the processing system (e.g., of an edge server) may obtain at least a portion of an immersive visual stream, the at least the portion including at least one chunk. The at least one chunk may also be subdivided into a plurality of tiles, as described herein. For instance, the portion of the immersive visual stream may be obtained from a centralized server for distributing immersive visual streams. In one example, the centralized server and the edge server may comprise components of a content distribution network (CDN). In one example, the immersive visual stream may comprise, for example, 360-degree video, non-360-degree panoramic video (e.g., less than a full 360-degrees in azimuth, elevation, or both), volumetric video, or any visual stream where field of view/viewport of a client device/mobile computing device is less than the entire frame. In addition, "video" can be recorded imagery, animation/computer generated imagery, a combination thereof, and so forth.

At step 220, the processing system obtains predicted viewports of a plurality of mobile computing devices for a chunk of the immersive visual stream (e.g., the at least one chunk that may be obtained at optional step 210). For instance, the predicted viewports may be for at least one future time period of the immersive visual stream. For example, the predicted viewports may be for anticipated playback times of the respective mobile computing devices for the chunk. In one example, the predicted viewports are obtained from the plurality of mobile computing devices. For instance, each of the plurality of mobile computing devices may determine a respective predicted viewport (e.g., in accordance with a plurality of previous viewports of the plurality of mobile computing devices for the immersive visual stream). The mobile computing devices may provide the predicted viewports via cellular and/or IEEE 802.11 wireless communication modalities, for example.

In another example, the processing system may calculate the predicted viewports. For instance, in one example, the mobile computing devices may send viewport traces comprising a sequence of viewports for a sequence of chunks (and/or frames thereof) of the immersive visual stream to the processing system (of the edge server) periodically or according to a different schedule, opportunistically (e.g., when network bandwidth fluctuates, viewport traces may be sent when network bandwidth is relatively higher), in response to a request from the processing system, etc. In one example, a viewport trace may comprise a sequence of viewport information (e.g., successive yaw, pitch, and roll measurements for a plurality of chunks and/or one or more frames thereof, which may additionally include device location and/or camera position information). The processing system, at step 220, may then calculate the predicted viewports in accordance with the plurality of previous viewports (e.g., viewport trace(s)) of the mobile computing devices for the plurality of prior chunks of the immersive visual stream. In one example, the calculations of the predicted viewports may be via a trained machine learning algorithm (MLA), e.g., a "machine learning model" (MLM), or other predictive algorithm.

In one example, the predicted viewports may be further determined in accordance with a plurality of previous viewports of a different plurality of mobile computing devices for the immersive visual stream. For instance, the predicted viewports may be calculated further based upon at least one of: historical viewport information regarding previous viewports with respect to the chunk for other mobile computing devices that have experienced the immersive visual stream or salient portions of the frame as determined in accordance with an image saliency detection algorithm. In one example, the mobile computing devices may calculate their own predicted viewports, and report the predicted viewports to the processing system (e.g., to the edge server). However, the processing system may integrate the mobile computing devices' predictions with historical viewport information from other devices and/or image saliency information to come up with final predicted viewports that may be used for tile selection and for selection of mobile endpoint devices for tile delivery in accordance with the following steps. In other words, the processing system may take into consideration the mobile computing devices' predictions, but may modify one or more of the predictions, if warranted, based upon additional knowledge of historical viewership and/or what is "salient" in the chunk and/or one or more upcoming chunks.

In one example, the mobile computing devices may also provide additional information that may be obtained by the processing system at step 220, such as location information of the mobile computing devices, the number of connections to other mobile computing devices experiencing the same immersive visual stream (e.g., the number of available peer-to-peer connections, the number of available peer-to-peer connections with a connection quality above a designated threshold, etc.), battery level information of the mobile computing devices, playback deadlines (anticipated playback times for the chunk at the respective mobile computing devices), and so forth.

In one example, each mobile computing device may determine which tiles are within the respective predicted viewport of the mobile computing device and may submit to the processing system one or more requests for such tiles. In other words, the tiles that are requested by a mobile computing device may indicate the bounds of the "predicted viewport" for that device.

At step 230, the processing system determines at least a first tile of the immersive visual stream that is within the predicted viewports of at least two mobile computing devices of the plurality of mobile computing devices. For instance, the mobile computing devices may indicate to the processing system the FoVs of the mobile computing devices, or the processing system may otherwise be aware of the FoVs/display capabilities of the mobile computing devices. As such, the processing system may determine the direction (e.g., yaw, pitch, roll) and the bounds of the FoVs to define the viewports. The processing system may then determine which tiles of the chunk correspond to the viewports. For instance, the tiles may be stored in a format which indicates the spatial relationship among the tiles (e.g., according to an equirectangular projection or the like). In addition, the viewport may be translated into corresponding regions/tiles according to the equirectangular projection, or a similar positional methodology. In another example, a mobile computing device may determine which tiles are within the respective predicted viewport of the mobile computing device and may submit to the processing system one or more requests for such tiles. In this case, the processing system may tally the number of requests for each tile that is received from the plurality of mobile computing devices. For instance, any tile having a request count of two or more may be determined to be within the predicted viewports of at least two mobile computing devices.

In one example, step 230 may comprise determining at least two tiles of the immersive visual stream that are within the predicted viewports of the at least two mobile computing devices of the plurality of mobile computing devices.

At optional step 240, the processing system may select an order for transmitting the at least two tiles, in accordance with a ranking based upon respective numbers of the predicted viewports that include the respective tiles of the at least two tiles (optional step 240 may be performed as part of the method 200 when at least two tiles of the immersive visual stream are determined to be within the predicted viewports of the at least two mobile computing devices). For instance, a tile that lies within three predicted viewports may have a higher ranking (and hence rank higher/earlier in the order) than a tile within two predicted viewports, and so on. In one example, the order is alternatively or additionally arranged in accordance with earliest playback deadlines of the at least two tiles. For instance, a tile having an earlier playback deadline is prioritized over a tile having a later playback deadline.

At step 250, the processing system selects a first mobile computing device of the at least two mobile computing devices to transmit the first tile. For instance, the selection may be based upon at least one of: a location of the first mobile computing device relative to at least one other mobile computing device of the at least two mobile computing devices having a predicted viewport that includes the first tile, a wireless channel quality of the first mobile computing device relative to the at least one other mobile computing device, a number of connections of the first mobile computing device with other mobile computing devices of the at least two mobile computing having predicted viewports that includes the first tile relative to a number of connections of the at least one other mobile computing device, a battery level of the first mobile computing device relative to the at least one other mobile computing device, or a proportional scheduling among at least a portion of the plurality of mobile computing devices.

In this regard, in various examples, the mobile computing devices may report various parameters to the processing system, such as the respective battery levels, channel qualities (e.g., throughput/bandwidth, etc.), locations, and so forth. In one example, proportional scheduling among the mobile computing devices may be round-robin among the at least two mobile computing devices, or among all of the plurality of mobile computing devices. For instance, the processing system may keep track of when the mobile computing devices were last used for a transmission of a tile for forwarding to others, and then may apply proportional and/or weighted scheduling among the at least two mobile computing devices (e.g., weighted based upon battery levels and/or distances to other devices that may need the same tile, etc.).

At optional step 260, the processing system may select the first mobile computing device or a second mobile computing device of the plurality of mobile computing devices to transmit at least a second tile of the at least two tiles. For instance, optional step 260 may comprise the same or similar operations as step 250, but with respect to another tile. In one example, the processing system may elect to send the at least the second tile to the first mobile computing device when the at least the second tile has the same priority as the first tile. In one example, the at least the second tile may have a lesser priority as compared to the first tile (e.g., the at least the second tile falls within a lesser number of predicted viewports). In this case, the criteria for selecting the mobile computing device to which the tile(s) should be delivered may lead to a different result (e.g., selecting a second mobile computing device to deliver the at least the second tile). For instance, the at least the second tile may be for a different set of mobile endpoint devices (e.g., a different subset of the plurality of mobile computing devices experiencing the immersive visual stream) with a different geographic/locational distribution, which may result in a determination of a different mobile computing device being in the center or closest to the center of such a group.

At step 270, the processing system transmits, to the first mobile computing device, the first tile and at least one identification of at least one other mobile computing device of the at least two mobile computing devices to which the first mobile computing device is to forward the first tile. In one example, the first mobile computing device may forward to all of the other mobile computing devices. In another example, the first mobile computing device may forward to a subset of the other mobile computing devices, which may in turn forward to additional mobile computing devices (that are identified by the processing system as being scheduled to receive the first tile) that do not receive the first tile from the first mobile computing device. It should be understood that the first mobile computing device is tasked with and/or configured to forward the first tile to the at least one other mobile computing device via a wireless peer-to-peer connection.

At optional step 280, the processing system may transmit to the first mobile computing device or to the second mobile computing device (e.g., that is selected at optional step 260) the second tile and at least one identification of at least one other mobile computing device to which the first mobile computing device or the second mobile computing device is to forward the second tile. The order of transmitting the first tile and the at least the second tile at step 270 and at optional step 280 may be the order that is selected at optional step 240. It should be understood that the first mobile computing device or the second mobile computing device is tasked with and/or configured to forward the first tile to the other mobile computing device(s) via a wireless peer-to-peer connection.

Following step 270 or optional step 280, the method 200 proceeds to step 295 where the method 200 ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 210-270, steps 220-280, etc. In one example, the method 200 may include storing the at least the portion of the immersive visual stream. For instance, the immersive visual stream, or at least a portion thereof, may be stored for other users who may be interested in experiencing the immersive visual stream via the respective mobile computing devices that may be served by the processing system. In still another example, the method 200 may include adjusting the rankings/priorities of different tiles based upon accuracies of one or more predicted viewports. For instance, the mobile communication devices and/or the processing system may track how closely predicted viewports for future playback times correspond to the actual viewports when those playback times arrive. For example, the accuracy may be a metric based upon a distance of a center of the predicted viewport to the center of the actual viewport, aggregated over several chunks/time period. In one example, the distances measured may be combined in a moving average, a weighted moving average, etc. For viewports of any mobile computing devices determined to be less than a threshold accuracy, the processing system may expand the predicted viewport, which may increase the priority/rank of one or more tiles. Thus, these and other modifications are all contemplated within the scope of the present disclosure.

FIG. 3 illustrates a flowchart of an example method 300 for obtaining at least a first tile of an immersive visual stream that is within a predicted viewport of a first mobile computing device and at least one identification of at least a second mobile computing device to which the first mobile computing device is to forward the first tile, in accordance with the present disclosure. In one example, the method 300 is performed by a component of the system 100 of FIG. 1, such as by one of devices 131-133, and/or any one or more components thereof (e.g., a processor, or processors, performing operations stored in and loaded from a memory), or by one of devices 131-133 in conjunction with one or more other devices, such as edge server 108, AS 104 or server 106, and so on. In one example, the steps, functions, or operations of method 300 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system (e.g., of a first mobile computing device) may obtain viewport information of the first mobile computing device associated with an immersive visual stream. For instance, in one example, optional step 310 may comprise determining a predicted viewport of the first mobile computing device for an immersive visual stream. The predicted viewport may be for a future time comprising an anticipated playback time for a chunk of the immersive visual stream. For instance, the processing system may apply a trained MLA, or a MLM, or other predictive technique to a plurality of prior viewports (e.g., a viewport trace) to predict a future viewport. In one example, the viewport prediction may be in accordance with measurements obtained via sensors of the first mobile computing device (e.g., to provide yaw, pitch, and roll parameters) and a FoV of the first mobile computing device. In one example, the viewport prediction may further be based upon current location information and/or recent location information (e.g., for volumetric video, and/or other immersive video which allows for movement of camera position within a visual space). In another example, the processing system may not determine a predicted viewport, but may instead collect information regarding a plurality of prior viewports (or information regarding the viewport for a plurality of chunks and/or frames thereof which have been rendered and displayed. In one example, the information may include yaw, pitch, and roll parameters. In another example, the information may include the bounds of the viewport for the prior chunks. In one example, the information may include position and/or location information, e.g., for volumetric video and/or for another type of immersive visual stream that allows for movement of a camera position within a visual space.

At step 320, the processing system transmits viewport information of the first mobile computing device to a server (e.g., an edge server or other server of an immersive visual streaming system). In one example, the viewport information may comprise a predicted viewport that is determined at optional step 310. In another example, the processing system may transmit information regarding a current or recent viewport (e.g., yaw, pitch, and roll measurements, and in some cases location information of the first mobile computing device, FoV size information, etc.). In one example, step 320 may comprise transmitting a viewport trace, e.g., information regarding a sequence of recent viewports. For instance, one or more prior viewports and/or the current viewport may be used by the server to calculate the predicted viewport of the first mobile computing device for a playback time associated with a chunk of the immersive visual stream. In still another example, the processing system may map the predicted viewport to one or more tiles (e.g., via equirectangular projection or the like, with regard to 360-degree video, or using another mapping technique with regard to other types of immersive visual streams). In other words, the viewport information transmitted at step 320 may comprise one or more requests for one or more of the tiles that are determined to be within the predicted viewport. In one example, step 320 may also include transmitting a battery level of the first mobile computing device, a channel quality of the first mobile computing device, location information of the first mobile computing device, a number of peer-to-peer connections of the first mobile computing device, and/or a current playback time of the first mobile computing device (e.g., what chunk is currently being rendered and displayed, and/or a progress time within the immersive visual stream). For example, the server may use the playback time to calculate an earliest playback deadline for the chunk containing at least the first tile.

At step 330, the processing system may obtain from the server: (1) at least a first tile of the immersive visual stream that is within the predicted viewport of the first mobile computing device and (2) at least one identification of at least a second mobile computing device to which the first tile is to be forwarded. For example, the tile may comprise a spatial subset of a chunk of the immersive visual stream. In one example, the transmitting of step 320 and the obtaining of step 330 may be via a mobile wireless network link, e.g., a cellular or IEEE 802.11 communication modality.

At step 340, the processing system may forward the first tile to at least the second mobile computing device in accordance with the at least one identification obtained at step 330. For instance, the forwarding may be via a wireless peer-to-peer communication that is different from the communication modality used to communicate with the server at steps 320 and 330. For example, the peer-to-peer communications may be in accordance with IEEE 802.15, e.g., Bluetooth, Wi-Fi Direct, or the like. In one example, the processing system may also buffer the first tile locally at the first mobile computing device.

At optional step 350, the processing system may obtain, from the second mobile computing device or a third mobile computing device, at least a second tile of the immersive visual stream that is within the predicted viewport of the first mobile computing device (the at least the second tile is for a different spatial subset of the same chunk as the first tile). For instance, the server may have elected to deliver the at least the second tile to another mobile computing device for forwarding to the first mobile computing device. Thus, the at least the second tile may be forwarded to the second mobile computing device or the third mobile computing device by the server, where the at least the second tile is within a respective predicted viewport of the second mobile computing device or the third mobile computing device (and is also within a predicted viewport of the first mobile computing device). In addition, the server may include an identification of at least the first mobile computing device to which the second mobile computing device or the third mobile computing device is to forward the at least the second tile. In one example, the processing system may buffer and/or store the at least the second tile locally at the first mobile computing device.

It should be noted that the server may prioritize the transmission of tiles as described above based upon the popularity (the number of predicted viewports within which each tile is predicted to lie) and/or the earliest playback deadline for each of the tiles. In addition, the server may also select from among different possible mobile computing devices to deliver tiles, e.g., based upon location, number of connections, battery level, the number of times the mobile computing device has already been selected to receive tiles for forwarding to others, etc.

At optional step 360, the processing system may present the at least the first tile via the first mobile computing device. In one example, optional step 360 may include presenting the at least the second tile via the first mobile computing device. For instance, the at least the first tile and the at least the second tile may be of a same chunk of the immersive visual stream. In one example, optional step 360 may include first determining the viewport of the first mobile computing device (e.g., a current viewport) and determining that the at least the first tile and/or the at least the second tile are within the viewport. For example, the actual viewport at the playback time for the chunk may be different from a predicted viewport used to determine that the at least the first tile and/or the at least the second tile should be delivered to the first mobile computing device.

Following step 340 or one of optional steps 350 or 360, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 310-340, steps 310-360, etc. In another example, the method 300 may include determining a viewport prediction accuracy and expanding the predicted viewport that may be sent in accordance with optional step 310 and step 320 based upon the viewport prediction accuracy. For instance, the processing system may report a wider FoV in cases where the viewport prediction accuracy is lower, e.g., to obtain additional tiles that may be outside the scope of the FoV in accordance with the predicted viewport. In one example, the method 300 may include the processing system indicating a preference of the mobile computing device to be selected for tile delivery and forwarding. For instance, in a classroom setting, an instructor's mobile computing device may have more processing or other compute resources, a better battery level and/or an alternate power source, etc. In this situation or in similar circumstances, it may be indicated to the server that the particular mobile computing device may be designated to receive more tiles for forwarding (e.g., more than would otherwise be selected according to a proportional scheduling methodology). Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the example(s) of FIG. 2 and/or FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for transmitting, to a first mobile computing device, a first tile of an immersive visual stream and at least one identification of at least one other mobile computing device to which the first mobile computing device is to forward the first tile or for obtaining at least a first tile of an immersive visual stream that is within a predicted viewport of a first mobile computing device and at least one identification of at least a second mobile computing device to which the first mobile computing device is to forward the first tile, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for transmitting, to a first mobile computing device, a first tile of an immersive visual stream and at least one identification of at least one other mobile computing device to which the first mobile computing device is to forward the first tile or for obtaining at least a first tile of an immersive visual stream that is within a predicted viewport of a first mobile computing device and at least one identification of at least a second mobile computing device to which the first mobile computing device is to forward the first tile (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for transmitting, to a first mobile computing device, a first tile of an immersive visual stream and at least one identification of at least one other mobile computing device to which the first mobile computing device is to forward the first tile or for obtaining at least a first tile of an immersive visual stream that is within a predicted viewport of a first mobile computing device and at least one identification of at least a second mobile computing device to which the first mobile computing device is to forward the first tile (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, predicted viewports of a plurality of mobile computing devices for an immersive visual stream, wherein mobile computing devices of the plurality of mobile computing devices are within a wireless peer-to-peer communication range with one another, wherein the plurality of mobile computing devices are presenting the immersive visual stream at a same time, and wherein the predicted viewports are for a chunk within a sequence of the immersive visual stream;
    determining, by the processing system, at least a first tile of the immersive visual stream that is within the predicted viewports of at least two mobile computing devices of the plurality of mobile computing devices, wherein the at least the first tile is from the chunk;
    selecting, by the processing system, a first mobile computing device of the at least two mobile computing devices to transmit the first tile; and
    transmitting, by the processing system to the first mobile computing device, the first tile and at least one identification of at least one other mobile computing device of the at least two mobile computing devices to which the first mobile computing device is to forward the first tile via a wireless peer-to-peer link.

2. The method of claim 1, wherein the predicted viewports are obtained from the plurality of mobile computing devices, wherein each of the plurality of mobile computing devices determines a respective predicted viewport.

3. The method of claim 1, wherein the predicted viewports are determined in accordance with a plurality of previous viewports of the plurality of mobile computing devices for the immersive visual stream.

4. The method of claim 3, wherein the predicted viewports are further determined in accordance with a plurality of previous viewports of a different plurality of mobile computing devices for the immersive visual stream.

5. The method of claim 1, wherein the determining the at least the first tile of the immersive visual stream that is within the predicted viewports of the at least two mobile computing devices of the plurality of mobile computing device comprises:
    determining at least two tiles of the immersive visual stream that are within the predicted viewports of the at least two mobile computing devices of the plurality of mobile computing devices.

6. The method of claim 5, further comprising:
    selecting the first mobile computing device or a second mobile computing device of the at least two mobile computing devices of the plurality of mobile computing devices to transmit at least a second tile of the at least two tiles; and
    transmitting, by the processing system to the first mobile computing device or to the second mobile computing device, the second tile and at least one identification of at least one other mobile computing device of the at least two mobile computing devices of the plurality of mobile computing devices to which the first mobile computing device or the second mobile computing device is to forward the second tile.

7. The method of claim 6, further comprising:
    selecting, by the processing system, an order for transmitting the at least two tiles, wherein the order is selected in accordance with a ranking based upon respective numbers of the predicted viewports that include the respective tiles of the at least two tiles.

8. The method of claim 7, wherein the order is selected further in accordance with playback deadlines of the at least two tiles.

9. The method of claim 8, wherein a tile having an earlier playback deadline is prioritized over a tile having a later playback deadline.

10. The method of claim 7, wherein the transmitting the first tile and the transmitting the second tile are in accordance with the order that is selected.

11. The method of claim 1, wherein the selecting the first mobile computing device to transmit the first tile is based upon at least one of:
- a location of the first mobile computing device relative to at least one other mobile computing device of the at least two mobile computing devices having a predicted viewport that includes the first tile;
- a wireless channel quality of the first mobile computing device relative to the at least one other mobile computing device;
- a number of connections of the first mobile computing device with other mobile computing devices of the at least two mobile computing devices having predicted viewports that include the first tile, relative to the at least one other mobile computing device;
- a battery level of the first mobile computing device relative to the at least one other mobile computing device; or
- a proportional scheduling among at least a portion of the plurality of mobile computing devices.

12. The method of claim 1, wherein the immersive visual stream comprises:
- a video having dimensions that exceed display capabilities of the plurality of mobile computing devices;
- a 360 degree video; or
- a volumetric video.

13. The method of claim 1, wherein the first mobile computing device is to forward the first tile to the at least one other mobile computing device via the wireless peer-to-peer link.

14. A non-transitory computer-readable medium storing instructions which, when executed by a processing system including at least one processor, cause the processing system to perform operations, the operations comprising:
- obtaining predicted viewports of a plurality of mobile computing devices for an immersive visual stream, wherein mobile computing devices of the plurality of mobile computing devices are within a wireless peer-to-peer communication range with one another, wherein the plurality of mobile computing devices are presenting the immersive visual stream at a same time, and wherein the predicted viewports are for a chunk within a sequence of the immersive visual stream;
- determining at least a first tile of the immersive visual stream that is within the predicted viewports of at least two mobile computing devices of the plurality of mobile computing devices, wherein the at least the first tile is from the chunk;
- selecting a first mobile computing device of the at least two mobile computing devices to transmit the first tile; and
- transmitting to the first mobile computing device, the first tile and at least one identification of at least one other mobile computing device of the at least two mobile computing devices to which the first mobile computing device is to forward the first tile via a wireless peer-to-peer communication.

15. A method comprising:
- obtaining, by a processing system of a first mobile computing device including at least one processor, viewport information of the first mobile computing device associated with an immersive visual stream;
- transmitting, by the processing system to a server, the viewport information of the first mobile computing device;
- obtaining, by the processing system from the server, at least a first tile of the immersive visual stream that is within a predicted viewport of the first mobile computing device and at least one identification of at least a second mobile computing device to which the at least the first tile is to be forwarded, wherein the predicted viewport is in accordance with the viewport information, wherein the predicted viewport is for a chunk of the immersive visual stream, wherein the at least the first tile is from the chunk, wherein the first mobile computing device and the at least the second mobile computing device are within a wireless peer-to-peer communication range with one another, wherein the first mobile computing device and the at least the second mobile computing device are presenting the immersive visual stream at a same time, and wherein the at least the first tile is also within a second predicted viewport of the at least the second mobile computing device; and
- forwarding, by the processing system to at least the second mobile computing device, the at least the first tile, in accordance with the at least one identification via a wireless peer-to-peer link.

16. The method of claim 15, further comprising:
- presenting, by the processing system, the at least the first tile via the first mobile computing device.

17. The method of claim 15, further comprising:
- obtaining, by the processing system from the second mobile computing device or a third mobile computing device, at least a second tile of the immersive visual stream that is within the predicted viewport of the first mobile computing device.

18. The method of claim 17, wherein the second tile is forwarded to the second mobile computing device or the third mobile computing device by the server, wherein the second tile is within the second predicted viewport of the second mobile computing device or a third predicted viewport of the third mobile computing device, wherein the server includes an identification of at least the first mobile computing device to which the second mobile computing device or the third mobile computing device is to forward the second tile.

19. The method of claim 15, wherein the transmitting further comprises transmitting at least one of:
- a battery level of the first mobile computing device;
- a channel quality of the first mobile computing device; or
- a current playback time of the first mobile computing device.

20. The method of claim 15, wherein the transmitting the viewport information and the obtaining the at least the first tile are via a mobile wireless network link, and wherein the wireless peer-to-peer link is different from the mobile wireless network link.

* * * * *